May 21, 1968     J. W. PHILLIPS     3,384,303

PNEUMATIC TEMPERATURE TRANSMITTER

Filed June 6, 1966

INVENTOR
JAMES W. PHILLIPS

BY *Anthony A. O'Brien*

ATTORNEY

United States Patent Office 3,384,303
Patented May 21, 1968

3,384,303
PNEUMATIC TEMPERATURE TRANSMITTER
James W. Phillips, South Bend, Ind., assignor to Robertshaw Controls Company, Richmond, Va., a corporation of Delaware
Filed June 6, 1966, Ser. No. 555,384
5 Claims. (Cl. 236—87)

This invention relates to a pneumatic temperature transmitter and, in particular, to a device that senses temperature variations at a particular location and transmits a proportional pneumatic signal analogous to the sensed temperature. Such a device is particularly useful in pneumatic control systems whereby temperature variations sensed at a remote location would effect the reset of a pneumatic controller by means of the pneumatic signal. Conventional devices of this type have been so expensive and so complex in structure and operation as to be generally impractical.

It is, therefore, an object of the present invention to provide a pneumatic temperature transmitter with a simple and economical construction.

Another object of this invention is to combine the thermally non-responsive element of a thermostatic device with the coil spring actuator of a control element.

This invention has another object in that the valve member of a pneumatic temperature transmitter is disposed in an accurately balanced arrangement.

In accordance with the present invention, a pneumatic temperature transmitter includes pneumatic signal conduit means adapted to deliver a pneumatic signal pressure to a controller, a valve body having inlet and outlet means, valve means in the body controlling a pneumatic flow from the inlet means which is in communication with the conduit means to the outlet means which is vented to the atmosphere, temperature responsive means carried by the valve body having a first element of thermally responsive material and a second element of thermally non-responsive material, means connecting adjacent ends of the first and second elements, and spring means integral with second element operatively connected to the valve means whereby the valve means varies the pneumatic flow to the atmosphere in proportion to the sensed temperature variations.

Figure 1:
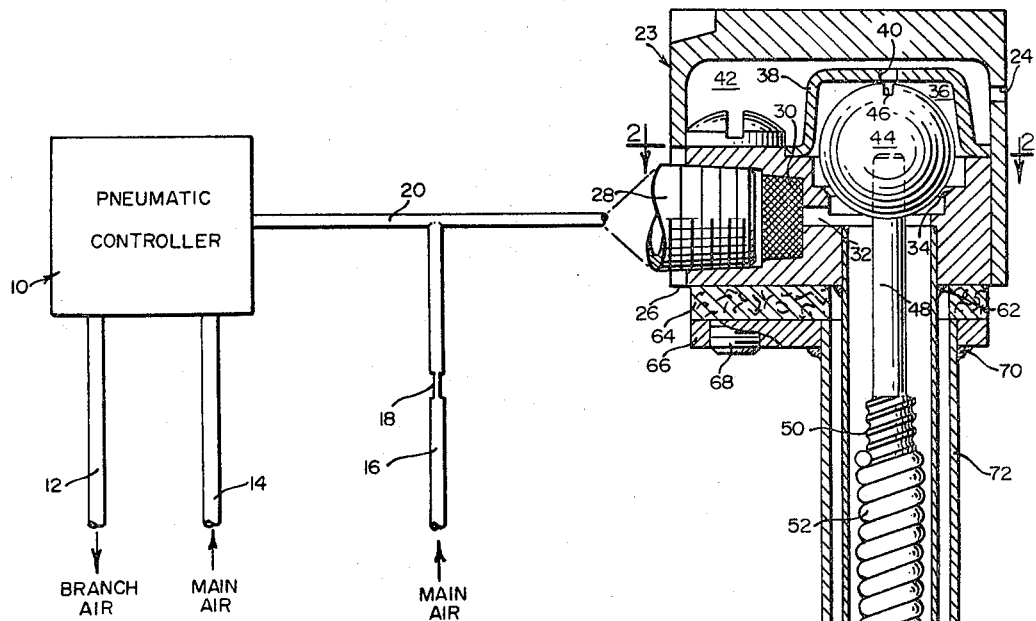
Figure 1:
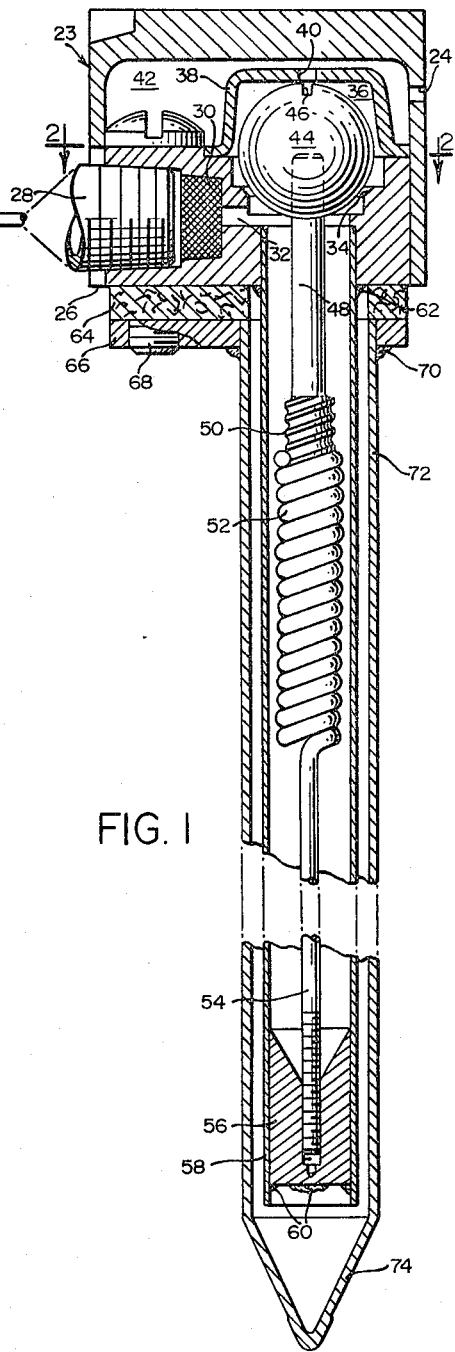
Figure 2:
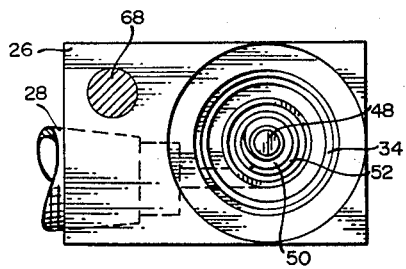

Other objects and advantages of the present invention will become apparent from the following description of a preferred embodiment, taken in connection with the accompanying drawing wherein:

FIG. 1 is a schematic diagram of a pneumatic control system embodying this invention with an enlarged detail shown in section; and FIG. 2 is a cross-section taken on line 2—2 of FIG. 1 with parts removed.

As is illustrated in FIG. 1, the present invention is embodied in a pneumatic control system including a pneumatic controller 10 having a branch air outlet connection 12 and a main air inlet connection 14. Since the pneumatic controller 10 may be of any suitable type, its particular structure is being omitted for the sake of brevity; it need only be noted that the main air pressure from a suitable pneumatic source (not shown) is fed to the controller 10 which controls the air flow therethrough and delivers a branch air pressure to a control device, such as a relay or valve controlling the operation of heating and/or air conditioning apparatus. In accordance with the present invention, the pneumatic controller may be reset or may vary the branch air pressure in response to a pneumatic signal from a remotely located temperature sensing device.

A main air conduit 16, connected to the pneumatic source, includes a restrictor 18 from which a signal pressure is delivered to an intermediate portion of a signal air conduit 20 as by a T-shaped fitting. One end of the conduit 20 is connected to the pneumatic controller 10 and the other end is connected to a pneumatic temperature transmitter, indicated generally at 23. The transmitter 23 has an upper cover which is vented to the atmosphere at 24 and which is snap fitted over a valve body 26.

The valve body 26 has a threaded inlet fitting 28 connected to the conduit 20 and leading to a cavity which houses a filter 30 and which communicates with an inlet valve chamber 32. An annular valve seat 34 separates the inlet chamber 32 from an outlet valve chamber 36 that is closed by an inverted cup-shaped cap element 38 having an annular flange which is press fitted or otherwise secured to a conforming recess in the top of the valve body 26. The cap element 38 has an aperture 40 establishing communication between the outlet chamber 36 and an atmospheric chamber 42 defined by the internal hollow portion of the cover.

A ball valve 44 cooperatives with the annular valve seat 34 and is movable relative thereto within the confines of the cap element 38. A top surface of the ball valve 44 is provided with a chordal slot 46 to receive an adjusting tool, such as a screw driver (not shown). On its surface opposite the slot 46, the ball valve 44 is centrally bored to a depth substantially the same as the radial dimension thereof. The bore receives one end of a rod 48 which is press fitted or otherwise non-rotatably secured to the ball valve 44; the opposite end of rod 48 is provided with external threads 50 onto which approximately one-half of a coil spring 52 is threaded. The coil spring 52 defines one end of a second rod 54 whose opposite end has external threads disposed in the centrally threaded bore of a brass plug 56 to permit relative adjustment therebetween.

The first rod 48, second rod 54, and the adjustment plug 56 are disposed along a common longitudinal axis and are enclosed by an outer concentric tube 58. The adjustment plug 56 is tightly fitted in the tube 58 and the adjacent ends thereof are sealed and connected by means of an annular joint 60, as by soldering, brazing, welding or the like. The open end of the tube 58 extends through a suitable opening in the valve body 26 and terminates adjacent the inlet chamber 32 so that the rod 48 may axially move therethrough as will be described more fully hereinafter. An annular joint 62, similar to joint 60, connects the exterior of the tube 58 to the bottom wall of the valve body 26. The tube 58 and adjustment plug 56 are made of thermally responsive material, such as brass, so that axial expansion and contraction in response to sensed temperature variations effects a corresponding axial movement of the second rod (52–54) which is made of relatively thermally non-responsive material, such as "Invar."

A gasket 64 abuts the bottom wall of the valve body 26 and is covered by a plate 66 which is secured to the valve body 26 as by a cap screw 68 extending through aligned bores in the valve body 26, the gasket 64 and the plate 66; the bore in plate 66 is threaded to receive the threads of the cap screw 68 whereby the plate 66 and gasket 64 are drawn tightly up against the bottom wall of the valve body 26. The gasket 64 and plate 66 also have concentric apertures through which the tube 58 protrudes. An outer tubing 72 extends through the plate aperture which is slightly larger in diameter than the gasket aperture, and has an open end abutting the gasket 64; the exterior of the tubing 72 is connected to the plate 66 by an annular joint 70 similar to joint 62. The tubing 72 surrounds the tube 58 throughout its length in spaced relation thereto, and is closed on its free end as by spinning into a hollow conical configuration 74, the apex of which is made water tight as by solder or the like. The tubing 72 is made of thermally conductive, non-corrosive material, such as copper, to define an immersion well for the tube 58. Thus the tubing 72 may be attached to apparatus that is to be temperature controlled, as by a compression fitting (not shown) whereby the tube 58 may respond to the temperature of the ambient environment without being subjected to adverse conditions of the ambient environment such as, corrosion, contamination, etc.

In the following description of the operation of the pneumatic temperature transmitter, it is to be noted that the main air flow from conduit 16 is reduced to a desired level by the restrictor 18 so as to deliver a signal air pressure to the signal air conduit 20. In combination with the ball valve 44 (a variable restrictor), the fixed restrictor 18 will effect a pressure change in the conduit 20; thus the signal air pressure sensed by the pneumatic controller 10 depends upon the condition of the ball valve 44. This arrangement constitutes a single pipe pneumatic control device wherein the ball valve 44 controls the bleed of the signal air to the atmosphere in response to temperature variations at the remotely located temperature transmitter 23.

The open position of the ball valve 44 is shown in FIG. 1 wherein the signal air from conduit 20 is being bled to the atmosphere. Upon increasing temperature, the tube 58 will move downwardly (as viewed in FIG. 1) causing seating of the ball valve 44 on seat 34 and stressing of the coil spring 52. Since the rod threads 50 only extend about half way into the coil spring 52, the coils on the lower half of the coil spring 52 are slightly separated from each other when such stressing occurs. When the ball valve 44 is closed, the signal air pressure in the inlet chamber 32 increases until the pneumatic force on the ball valve 44 balances the biasing force of the coil spring 52. As the signal air pressure on the ball valve 44 begins to exceed the biasing force, it will unseat the valve and bleed the excess air to the atmosphere while maintaining a pressure force equal to the biasing force. Since the expansion of the tube 58 and, therefore, the tension of the coil spring 52, varies in direct proportion to temperature variations, it follows that the signal air pressure in the conduit 20 will vary in direct proportion to temperature variation.

The tension of the coil spring 52 is adjustable by removing the top cover on the valve body 26 and inserting a screw driver bit through the cap opening 40 into the ball slot 46. Rotation of the ball valve 44 and its rigidly connected rod 48 causes the coil spring 52 to be threaded up or down the rod threads 50. Accordingly, the actual temperature at which the device will transmit a given pressure signal to the controller 10 may be adjusted by adjusting the load of the tension spring 52. The threaded end of rod 54 and adjustment plug 56 provide initial adjustment or factory calibration of the device during assembly; if necessary, subsequent field calibration may be effected by removal of the cap element 38 and the removal of the ball valve 44 and its rod 48 as by unthreading from the coil spring 52.

The operating range of the pneumatic temperature transmitter, which is the range of the temperature variation necessary to cause a full range pressure change, is a function of the coil spring 52 and is, therefore, fixed once the above adjustments have been made. It is desired that the pneumatic temperature transmitter provide a fixed signal range for the pneumatic controller 10, for example, a 3–15 p.s.i.g. pressure range; however, to provide a different temperature range for different installations, different types of springs may be utilized whereby the spring loads are different without changing the 3–15 p.s.i.g. pressure range. By way of example, one spring may be utilized where its spring load conforms to a temperature range with a 60° F. differential and a second spring utilized where its spring load conforms to a temperature range with a 180° F. differential.

It should be noted that the integral construction of the coil spring 52 and the rod 54 provides a particular advantage in that the forces acting on the ball valve 44 do not create unbalance but rather enhance the balancing of the valve. For instance, the biasing force of the coil spring 52 does not act in opposition to the ball valve itself but rather acts in opposition to the expansion of the tube 58; the direction of these forces are in the same plane, i.e., they are coaxial and the resultant force is the one that acts on the ball valve 44. Of course, the ball valve 44 is also subject to pressure force, but its spherical surface causes the direction of the pressure force to be toward the center of the ball, which center is also coaxial with the axis of the rod 54. With such an arrangement, the ball valve 44 will be precisely positioned to vary the bleed flow in proportion to sensed temperature variations.

Inasmuch as the preferred embodiment of the present invention is subject to many modifications, variations and changes in detail, it is intended that all matter contained in the foregoing description or shown on the accompanying drawing shall be interpreted as illustrative and not in a limiting sense.

What is claimed is:

1. In a single pipe pneumatic temperature transmitter, the combination comprising, pneumatic signal conduit means having three intercommunicating portions, the first portion adapted to receive a pneumatic signal pressure, the second portion adapted to deliver the pneumatic signal pressure to controller means, and the third portion adapted to vary the pneumatic signal pressure by venting to the atmosphere, a valve body having inlet means communicating with said third portion and outlet means communicating with the atmosphere, valve means in said body controlling the venting of the pneumatic signal pressure from said inlet means to said outlet means whereby the pneumatic signal pressure therein is varied by said valve means, said valve means including a ball valve having a valve stem and adjustable means thereon, temperature responsive means carried by said valve body including a first element of thermally responsive material in the form of a tube surrounding a second element of thermally non-responsive material in the form of a rod, plug connection means connecting adjacent ends of said rod and tube whereby thermal expansion and contraction of the tube effects a corresponding movement of rod element, and spring means integrally formed on said rod and operatively connected to said valve stem adjustable means whereby said ball valve varies the pneumatic signal pressure to said outlet means in response to temperature variations causing a corresponding variation of the pneumatic signal pressure in said conduit means.

2. The combination as recited in claim 1 wherein said adjustable means comprises helical threads on said valve stem and said spring means comprises a helical coil spring threaded onto said helical threads.

3. The combination as recited in claim 2 wherein said helical coil spring defines a tension spring for biasing said ball valve toward a closed position.

4. The combination as recited in claim 2 wherein a cap element covers said ball valve and is secured to said valve body.

5. The combination as recited in claim 4 wherein said outlet means includes an opening in said cap element and said ball valve includes a recess slot aligned with said opening to facilitate rotation of said ball valve and valve stem for operating said adjustable means.

References Cited

UNITED STATES PATENTS

| | | | |
|---|---|---|---|
| 808,707 | 1/1906 | Wadsworth | 236—87 |
| 2,065,703 | 12/1936 | Hubbard | 236—87 |
| 3,342,412 | 9/1967 | Alamprese et al. | 236—87 |
| 912,286 | 2/1909 | Comfort | 236—87 |

WILLIAM J. WYE, *Primary Examiner.*